United States Patent [19]

Mafoti et al.

[11] Patent Number: 5,066,824
[45] Date of Patent: Nov. 19, 1991

[54] NOVEL PROCESS FOR THE PREPARATION OF AMINE-TERMINATED COMPOUNDS

[75] Inventors: Robson Mafoti; Josef Sanders, both of Pittsburgh, Pa.

[73] Assignee: Mobay Corporation, Pittsburgh, Pa.

[21] Appl. No.: 562,293

[22] Filed: Aug. 3, 1990

Related U.S. Application Data

[63] Continuation-in-part of Ser. No. 524,268, May 15, 1990, abandoned.

[51] Int. Cl.$^5$ .............................................. C07C 209/00
[52] U.S. Cl. ...................................... 560/44; 558/265; 558/269; 560/169; 564/135; 564/337; 564/346; 564/393; 564/396; 564/397; 564/468; 564/471; 564/472
[58] Field of Search ............... 564/393, 396, 397, 468, 564/471, 472, 135, 337, 346; 560/44, 168, 169; 558/265, 269

[56] References Cited

U.S. PATENT DOCUMENTS

| | | | |
|---|---|---|---|
| 3,211,793 | 10/1965 | Roos | 260/577 |
| 3,666,726 | 5/1972 | Grogler et al. | 260/77.5 |
| 3,691,112 | 9/1972 | Grogler et al. | 260/2.5 |
| 4,188,403 | 2/1980 | Orth et al. | 424/330 |

*Primary Examiner*—Glennon H. Hollrah
*Assistant Examiner*—Peter G. O'Sullivan
*Attorney, Agent, or Firm*—Joseph C. Gil; Godfried R. Akorli

[57] ABSTRACT

The present invention is directed to a process for preparing amine terminated compounds by reacting a polyfunctional acetoacetic acid ester with either ammonia or an organic compound which contains one or more primary amino groups in the presence of a solvent and an acidic catalyst selected from the group consisting of (i) boron trifuloride etherate and (ii) organic acids having pKa values of from 0.1 to 0.8 with the proviso that if the primary amino group containing compound contains no aromatically bound amino groups, the pKa of said organic acid is from 0.1 to less than 0.7.

8 Claims, No Drawings

NOVEL PROCESS FOR THE PREPARATION OF AMINE-TERMINATED COMPOUNDS

This application is a continuation-in-part of Ser. No. 07/524,268 filed May 15, 1990, now abandoned.

BACKGROUND OF THE INVENTION

U.S. Pat. No. 3,691,112 (and the corresponding German Offenlegungsschrift 1,935,484) describes the preparation of compounds by reacting a polyfunctional acetoacetic acid ester with ammonia or an aliphatic or aromatic primary or secondary monoamine. The reaction is conducted in the presence of a solvent (hydrocarbons, such as benzene and toluene, and halogenated hydrocarbons, such as chloroform and carbon tetrachloride, are disclosed) and a catalyst. Suitable catalysts are described as "acids, for example hydrochloric acid, formic acid or glacial acetic acid, or other compounds such as iodine, cation exchangers or active alumina."

U.S. Pat. No. 3,666,726 (and the corresponding German Offenlegungsschrift 1,935,485) describes the preparation of similar compounds by reacting a polyfunctional acetoacetic acid ester with aliphatic aminoalcohols or diamines of different reactivity towards acetoacetic acid esters, e.g., those which contain primary and secondary or, alternatively, aliphatic and aromatic amino groups in the molecule. All of the diamines disclosed contain at least one aliphatic amino group. The reaction is conducted in the presence of a solvent (hydrocarbons, such as benzene and toluene, and halogenated hydrocarbons, such as chloroform and carbon tetrachloride, are disclosed) and a catalyst. Suitable catalysts are described as "acids, for example hydrochloric acid, formic acid or glacial acetic acid, or other compounds such as iodine, cation exchangers or active alumina." The reference does not describe the use of any specific polyamines where the amino groups are all directly attached to aromatic groups.

DESCRIPTION OF THE INVENTION

The present invention is directed to novel process for preparing amino group containing compounds. More particularly, the present invention is directed to a novel process for the preparation of an amine-terminated compound by reacting a polyfunctional acetoacetic acid ester with either ammonia or an organic compound which contains one or more primary amino groups in the presence of a solvent and an acidic catalyst selected from the group consisting of (i) boron trifluoride etherate and (ii) organic acids having pKa values of from 0.1 to 0.8, with the proviso that if the primary amino group containing compound contains no aromatically bound amino groups, the pKa of said organic acid is from 0.1 to less than 0.7. By this invention, it is possible to produce a wide variety of different amines having a wide variety of different reactivities by selection of the primary amino compound uSed in the preparation thereof.

In the preferred process, aromatic primary diamines are reacted with the polyfunctional acetoacetic acid esters. The amines produced herein are useful in the production of isocyanate addition products, such as, e.g., by reaction with organic isocyanates.

The polyfunctional acetoacetic acid esters useful herein are produced by techniques generally known in the art. For example, the acetoacetic acid esters may be produced according to the processes described in U.S. Pat. Nos. 3,666,726 and 3,691,112, the disclosures of which are herein incorporated by reference. In general, the acetoacetic acid esters can be produced by reacting polyols with diketenes, or by transesterifying alkyl acetoacetates with polyols. The transesterification technique is the presently preferred technique. In general, the transesterification reaction is conducted at temperatures ranging from 100° to 210° C., preferably from 160° to 210° C. for periods of time ranging from 2 to 8 hours. If desired, transesterification catalysts, such as dibutyltin oxide and tetrabutyl titanate, can be used.

The polyols useful in producing the polyfunctional acetoacetic acid esters are of the type generally used in polyurethane chemistry. The polyols useful herein typically have molecular weights of from 62 to 12,000 and have hydroxyl functionalities of from 2 to 6. Examples of suitable compounds include the polyesters, polyethers, polythioethers, polyacetals, polybutadienes and polycarbonates containing 2 to 6 hydroxyl groups of the type known for the production of polyurethanes. The polyethers suitable for use in accordance with the invention are known and may be obtained, for example, by polymerizing epoxides such as ethylene oxide, propylene oxide, butylene oxide, tetrahydrofuran, styrene oxide or epichlorohydrin in the presence of $BF_3$ or by chemically adding these epoxides, preferably ethylene oxide and propylene oxide, in admixture or successively to components containing reactive hydrogen atoms such as water, alcohols or amines. Examples of alcohols and amines include low molecular weight diols, triols and tetrols, 4,4'-dihydroxy diphenyl propane, sorbitol, aniline, ammonia, ethanolamine and ethylene diamine.

Suitable examples of polyesters include the reaction products of polyhydric, preferably dihydric alcohols (optionally in the presence of trihydric alcohols), with polyvalent, preferably divalent, carboxylic acids. Instead of using the free carboxylic acids, it is also possible to use the corresponding polycarboxylic acid anhydrides or corresponding polycarboxylic acid esters of lower alcohols or mixtures thereof for producing the polyesters. The polycarboxylic acids may be aliphatic, cycloaliphatic, aromatic, and/or heterocyclic and may be unsaturated or substituted, for example, by halogen atoms. The polycarboxylic acids and polyols used to prepare the polyesters are known and described for example in U.S. Pat. Nos. 4,098,731 and 3,726,952, herein incorporated by reference in their entirety. Suitable polythioethers, polyacetals, polycarbonates and other polyhydroxyl compounds are also disclosed in the above-identified U.S. patents. Finally, representatives of the many and varied polyols which may be used in accordance with the invention may be found for example in High Polymers, Volume XVI, "Polyurethanes, Chemistry and Technology," by Saunders-Frisch, Interscience Publishers, New York, London, Vol. I, 1962, pages 32–42 and 44–54, and Volume II, 1964, pages 5–6 and 198-199; and in KunststoffHandbuch, Vol. VII, Vieweg-Hochtlen, Carl Hanser Verlag, Munich, 1966, pages 45–71.

Polyols useful herein also include materials which are typically used as chain extenders in polyurethane chemistry. Examples of such materials include ethylene glycol, 1,2- and 1,3-propane diol, 1,3- and 1,4- and 2,3-butane diol, 1,6-hexane diol, 1,10-decane diol, diethylene glycol, triethylene glycol, tetraethylene glycol, dipropylene glycol, tripropylene glycol, glycerol, trimethylol propane, and pentaerythritol.

The polyfunctional acetoacetic acid esters are preferably prepared by transesterifying any of the above noted polyols with lower alkyl acetoacetates. By "lower alkyl" is meant alkyl groups containing from one to five carbon atoms. Specific useful acetoacetates include methyl acetoacetate, ethyl acetoacetate, t-butyl acetoacetate, propyl acetoacetate and the like, with t-butyl acetoacetate being the presently preferred material. In preparing the acetoacetic acid esters herein, transesterification catalysts may be necessary. In preparing the polyfunctional acetoacetic acid esters, it is generally preferred that the reactants be used in amount such that one OH group is present for each acetoacetate group. However, it is also possible to use excess amounts of either reactant. In fact, in some cases it is preferred to use an excess of the acetoacetate to ensure complete reaction.

The polyfunctional acetoacetic acid ester is then reacted with either ammonia or a primary amine in the presence of a solvent and a specified acidic catalyst.

The solvents useful herein are of the same type described in U.S. Pat. Nos. 3,666,726, and 3,691,112. Preferred solvents are those that form azeotropes with water. Suitable solvents include methylene chloride, chloroform, chlorobenzene, dichlorobenzenes, toluene, xylenes, ethylacetate, propylacetate, butylacetate, diethylether, dibutylether, and the like. Toluene is the presently preferred solvent. The amount of solvent is generally selected so as to be sufficient for dissolving the starting materials. In general, the solvent is used in a quantity of from 20 to 500, and preferably from 50 to 200 parts by weight per 100 parts by weight of the polyfunctional acetoacetic acid ester.

Critical to the present invention is the selection of the catalyst. The catalyst is selected from the group consisting of boron trifluoride etherate and organic acids having pKa values of from 0.1 to 0.8. It has been found that use of catalysts having pKa values outside range noted leads to side reactions which lead to solid products. In addition, only the catalysts noted lead to commercially acceptable yields. Of the acids tested, only trifluoroacetic acid (pKa: 0.23) and p-toluene sulfonic acid (pKa: 0.7) were found useful in preparing amines from aromatic amine compounds, while only trifluoroacetic acid was useful in preparing amines from ammonia or aliphatic amines. The amount of catalyst is generally selected so as to be sufficient to allow reasonable reaction times. In practice, the catalyst is added in amounts of from 0.05 to 2.0 mol %, and preferably from 0.3 to 1.0 mol %, based on the equivalents of acetoacetate present. This corresponds to from 0.01 to 0.2% by weight, and preferably from 0.05 to 0.1% by weight based on the weight of the polyfunctional acetoacetic acid ester.

Useful amines which are to be reacted with the polyfunctional acetoacetic acid esters are ammonia, and primary aliphatic and aromatic amines. Specific amines include ethylene diamine; propylene diamine; diethylene triamine; triethylene tetramine; diethyltoluene diamine and the various isomers and isomer mixtures thereof; toluene diamine and the various isomers and isomer mixtures thereof; methylenebis(phenyl amine) and the various isomers and isomer mixtures thereof; 1,5-naphthalene diamine; isophorone diamine; aniline; alkyl anilines; toluidine; t-butyl toluene diamine, and the various isomers and isomer mixtures thereof; di-t-butyl toluene diamine, and the various isomers and isomer mixtures thereof; methylenebis(o-dichloroaniline) ("MOCA"); 2,4-diaminoalkybenzenes, and homologues and isomers thereof having alkyl radicals of from 8 to 15 carbon atoms as described in published European patent application 58,368; and the like.

The amount of amine is generally selected so that one mole of amine is available for every acetoacetate equivalent. It is of course possible to react less than one mole amine with one equivalent of acetoacetate. This might result in a lower conversion if the reaction is terminated before all acetoacetate groups have reacted with amine groups, or in chain extension if all acetoacetate groups have reacted. On the other hand, in order to suppress chain extension and to obtain low viscosity products, it might be advantageous to use more than one mole amine per equivalent of acetoacetate. The unreacted amine can either be stripped off once the reaction is complete, or can remain in the product to serve as a chain extender, i.e., in a reaction with isocyanates.

The reaction is generally carried out at temperatures of from 40° to 200° C., preferably from 90° to 140° C., under excess pressure, reduced pressure, or, preferably, in the substantial absence of pressure. The process can be conducted continuously or discontinuously. In general, the acetoacetic acid ester, the amines, and the catalyst are dissolved in the solvent. The reaction mixture is refluxed while the water of reaction is collected. When no more water comes off, the reaction is considered complete. The reaction time, of course, depends on the nature and the amounts of starting materials. In general, reaction times are between 1 and 6 hours. When the reaction is complete, the catalyst and any unreacted amine (if desired) are distilled off. The distillate can generally be recycled.

The invention is further illustrated but is not intended to be limited by the following examples in which all parts and percentages are by weight unless otherwise specified.

EXAMPLES

In the examples showing the production of the polyfunctional acetoacetic acid esters, the apparatus used consisted of (i) a vacuum jacketed distillation column with metal packing, (ii) a variable reflux ratio distilling head with a round bottom flask attached to receive alkanol and excess alkyl acetoacetate, (iii) a five liter three neck flask, and (iv) a thermoregulator and a heating mantle. The following polyols were used:

POLYOL A: a glycerine/propylene oxide/ethylene oxide triol having an OH number of 35 (weight ratio of propylene oxide to ethylene oxide of 83:17 with the oxides being reacting sequentially, i.e., propylene oxide and then ethylene oxide).

POLYOL B: a polyoxypropylene glycol having a molecular weight of about 1000.

POLYOL C: a polyoxypropylene glycol having a molecular weight of about 2000.

POLYOL D: a polyoxypropylene triol from glycerine and propylene oxide having a molecular weight of about 3000.

POLYOL E: a 1000 molecular weight polyester prepared by reacting neopentyl adipate and adipic acid.

POLYOL F: a 1000 molecular weight polytetramethylene glycol.

GENERAL PROCEDURE

A five liter flask was charged with the polyol, and nitrogen was bubbled through the flask, and the temperature was raised to 130° C. t-Butyl acetoacetate ("tBAA") was charged into an addition funnel and added to the flask dropwise. At the completion, the temperature was raised to 160° C. t-Butanol ("tB") was collected in the receiving flask. Once the t-butanol stopped coming off, vacuum was slowly applied to remove residual t-butanol and unreacted t-butyl acetoacetate. The amount of t-butanol collected was noted and the product was characterized by IR. The disappearance of the hydroxyl peak around 3500–3400 cm$^{-1}$ indicated the completion of the reaction. The average time for the acetoacetylation was two hours. The 10 acetoacetylated products were produced using the amounts of materials noted in the following table:

TABLE 1

| Acetoacetylated Product | Polyol | pbw Polyol | pbw tBAA | pbw tB |
|---|---|---|---|---|
| 1 | A | 7500 | 740 | 152 |
| 2 | C | 7000 | 1107 | 228 |
| 3 | D | 7000 | 1107 | 518 |
| 4 | B | 6000 | 1898 | 888 |
| 5 | A | 7500 | 740 | 152 |
| 6 | E | 2000 | 633 | 296 |
| 7 | F | 2000 | 633 | 296 |
| 8 | C | 7000 | 1107 | 518 |
| 9 | D | 7000 | 1105 | 513 |
| 10 | B | 6000 | 1898 | 888 |

EXAMPLE 1 THROUGH 14

The following amines were used in the examples which follow:
DETDA: diethyltoluene diamine
m-TDA: a mixture of toluene diamines comprising 19% by weight of the 2,6-isomer, 76% by weight of the 2,4-isomer, and with the balance being the 2,3- and 3,4-isomers
MDA: 4,4'-methylenebis(phenyl isocyanate)
o-TDA: a mixture of toluene diamines comprising 40% by weight of the 2,3-isomer and 60% by weight of the 3,4-isomer
NDA: 1,5-naphthalene diamine
IPDA: isophorone diamine
ANI: aniline
o-T: ortho-toluidine

GENERAL PROCEDURE

A three neck flask was charged with the acetoacetylated product noted in Table 2, the amine, trifluoroacetic acid, and toluene, in the amounts noted in Table 2. The flask was fitted with a Dean Stark Trap so as to reflux the toluene and at the same time collect water generated from the reaction. The reaction was stirred and nitrogen was bubbled through. The temperature was raised to 115°–120° C. The reaction sequence was monitored by the amount of water collected. Once water was no longer being collected, the Dean Stark Trap was replaced with a condenser and the toluene was removed by distillation. Vacuum was applied to the system to ensure total removal of toluene and catalyst. In Table 3, the theoretical and actual amounts of water collected are noted. Additionally, the table lists the viscosities of the resultant product at 23 and 60° C.

TABLE 2

| Example | Acetoacetylated Product, pbw | Amine, pbw | Toluene, ml | Catalyst, pbw |
|---|---|---|---|---|
| 1 | 1,2000 | DETDA, 211 | 1370 | 0.8 |
| 2 | 2,2000 | DETDA, 326 | 1370 | 0.8 |
| 3 | 3,2000 | DETDA, 328 | 1370 | 0.8 |
| 4 | 4,2000 | DETDA, 610 | 1370 | 0.8 |
| 5 | 5,2000 | m-TDA, 145 | 1370 | 0.8 |
| 6 | 6,1500 | DETDA, 459 | 800 | 0.6 |
| 7 | 7,1280 | DETDA, 389 | 800 | 0.5 |
| 8 | 1,500 | MDA, 59 | 600 | 0.2 |
| 9 | 8,2000 | m-TDA, 225 | 1370 | 0.8 |
| 10 | 10,2000 | m-TDA, 418 | 1370 | 0.8 |
| 11 | 5,500 | o-TDA, 36 | 600 | 0.2 |
| 12 | 4,585 | o-TDA, 120 | 700 | 0.2 |
| 13 | 5,1000 | NDA, 90 | 1200 | 0.4 |
| 14 | 9,2000 | m-TDA, 225 | 1200 | 0.8 |
| 15 | 5,500 | IPDA, 51 | 600 | 0.2 |
| 16 | 5,500 | ANI, 28 | 600 | 0.2 |
| 17 | 5,1500 | O-T, 96 | 1600 | 0.6 |

TABLE 3

| Example | water, calc. | water, recov. | % conversion | Viscosities, mPas 23° C. | 60° C. |
|---|---|---|---|---|---|
| 1 | 21.4 | 18.2 | 85 | 9,970 | 1,500 |
| 2 | 33.2 | 32.5 | 98 | 4,000 | 500 |
| 3 | 33.2 | 32.0 | 96 | 15,930 | 1,500 |
| 4 | 61.6 | 58.8 | 95 | 16,500 | 1,250 |
| 5 | 20.0 | 18.2 | 91 | nt | 1,430 |
| 6 | 46.2 | 44.8 | 97 | solid | 29,000 |
| 7 | 46.2 | 46.2 | 100 | 38,500 | 5,400 |
| 8 | 5.3 | 4.8 | 91 | 56,000 | 7,800 |
| 9 | 33.2 | 26.5 | 80 | 3,500 | 500 |
| 10 | 61.6 | 50.0 | 81 | 12,500 | 500 |
| 11 | 5.3 | 4.2 | 79 | 1,070 | 230 |
| 12 | 18.0 | 14.4 | 80 | 850 | 180 |
| 13 | 10.6 | 9.2 | 87 | 12,900 | 1,390 |
| 14 | 33.2 | 25.5 | 77 | 10,000 | 1,000 |
| 15 | 15.9 | 15.9 | 100 | 21,900 | 3,360 |
| 16 | 15.9 | 12.0 | 76 | 1,420 | 370 |
| 17 | 15.9 | 14.2 | 89 | 1,770 | 190 |

CATALYST EXAMPLES

Reaction of Ethylacetoacetate with Ammonia 250 parts of ethylacetoacetate and 150 ml of toluene were charged into a 500 ml three neck flask fitted with a Dean Stark Trap and an inlet for introducing ammonia. For catalysts, 0.05 parts (0.44 mmol) of trifluoroacetic acid were added to the solution. At reflux temperature, ammonia was introduced and water was collected in the trap. The reaction was considered complete when no more water came out. Table 4 below shows the results of running the identical process with equimolar amounts of different acids as catalysts.

TABLE 4

| Catalyst (pKa) | Amount, pbw | Time, hrs | Water recov, ml | % theor | Comments |
|---|---|---|---|---|---|
| Oxalic acid (1.23) | 0.02 | 7.5 | 63 | 182 | some solids in condenser |
| Formic acid (3.77) | 0.02 | 8.5 | 58 | 168 | solids in flask and condenser |
| Dihydroxybenzoic acid (1.30) | 0.07 | 11.5 | 42.5 | 123 | solids in condenser |
| Trifluoroacetic acid (0.23) | 0.05 | 6.0 | 32.8 | 95 | no solids |
| Acetic acid (4.76) | 0.03 | 9.0 | 25.9 | 75 | solids in condenser |

TABLE 4-continued

| Catalyst (pKa) | Amount, pbw | Time, hrs | Water recov, ml | % theor | Comments |
|---|---|---|---|---|---|
| p-Toluenesulfonic acid (0.7) | 0.08 | 8.5 | 23.8 | 69 | solids in condenser |
| 1-N Hydrochloric acid (0) | 0.02 | 10.0 | 12.5 | 36 | solids in condenser |
| none | — | 8.5 | 69.0 | 199 | solids in condenser |

As can be seen from Table 4, only trifluoroacetic acid showed good conversion and no side reactions as evidenced by no solids in the condenser. A water recovery of more than 100% reflects a split of the ester linkage. This resulted in the formation of ethanol as a by-product that distilled and showed up in the water phase. The other side product that resulted from this side reaction was aminocrotonamide. This material distilled too and was collected as a white solid in the condenser.

The catalysis tests was exactly repeated except that various Lewis acids were tested and the reaction was terminated after 2 hours. The results were as shown in Table 5 which follows:

TABLE 5

| Catalyst (pKa) | Amount, pbw | Water recov, ml | % theor | Comments |
|---|---|---|---|---|
| Boron trifluoride etherate | 0.06 | 26.5 | 76.7 | no solids |
| SnCl$_2$ | 0.08 | 20.1 | 58.3 | solids in condenser |
| SnCl$_4$ | 0.11 | 23.0 | 66.7 | solids in condenser |
| ZnCl$_2$ | 0.06 | 9.6 | 27.7 | solids in condenser |

As can be seen from Table 5, only boron trifluoride etherate showed good conversion and no side reactions as evidenced by no solids in the condenser. The side product that resulted from this side reaction was aminocrotonamide. This material distilled and was collected as a white solid in the condenser.

Reaction of acetoacetylated material with aromatic amine 300 parts of acetoacetylated product 8 of Table 1, 49.1 parts of DETDA and 300 ml of toluene were charged into a one liter three neck flask fitted with a stirrer and a Dean Stark Trap. Following addition of 0.2 parts (1.75 mmol) of trifluoroacetic acid, the solution was refluxed until no more water came out. Table 6 below shows the results of running the identical process with equimolar amounts of different acids as catalysts.

TABLE 6

| Catalyst (pKa) | Amount, pbw | Time, hrs | Water recov, ml | % theor | Comments |
|---|---|---|---|---|---|
| Formic acid (3.77) | 0.09 | 1.0 | 0 | 0 | solids in flask over night |
| Trifluoroacetic acid (0.23) | 0.2 | 2.0 | 4.2 | 85 | no solids |
| Acetic acid (4.76) | 0.11 | 1.0 | 0 | 0 | solids in flask during reaction |
| p-Toluenesulfonic acid (0.7) | 0.3 | 1.5 | 3.6 | 73 | no solids |
| none | — | 1.0 | 0 | 0 | solids in flask during reaction |

As can be seen from Table 6, only trifluoroacetic acid and p-toluenesulfonic acid showed good conversion and no side reactions as evidenced by no solids in the condenser. In the cases of formic acid, acetic acid, and no catalyst, the reaction mixture turned milky, indicating that solids had formed as a result of side reactions.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the preparation of an amine-terminated compound comprising reacting a polyfunctional acetoacetic acid ester with either ammonia or an organic compound which contains one or more primary amino groups in the presence of a solvent and an acidic catalyst selected from the group consisting of (i) boron trifluoride etherate and (ii) organic acids having pKa values of from 0.1 to 0.8, with the proviso that if the primary amino group containing compound contains no aromatically bound amino groups, the pKa of said organic acid is from 0.1 to less than 0.7.

2. The process of claim 1, wherein said organic acid is a halogenated organic carboxylic acid.

3. The process of claim 2, wherein said organic acid is a halogenated acetic acid.

4. The process of claim 3, wherein said organic acid is trifluoroacetic acid.

5. The process of claim 1, wherein said polyfunctional acetoacetic acid ester is prepared by reacting a $C_1$ to $C_5$ alkyl acetoacetate with a organic compound containing from 2 to 6 hydroxyl groups and having a molecular weight of from 62 to about 12,000, in a ratio such that one mole of acetoacetate is used for each hydroxyl group.

6. The process of claim 5, wherein said polyfunctional acetoacetic acid ester is prepared by reacting a $C_1$ to $C_5$ alkyl acetoacetate with a organic compound containing from 2 to 4 hydroxyl groups and having a molecular weight of from 192 to 8,000, in a ratio such that one mole of acetoacetate is used for each hydroxyl group.

7. The process of claim 1, wherein said organic compound is an aromatic diamine.

8. The process of claim 7, wherein said aromatic diamine is selected from the group consisting of toluene diamines, alkyl-substituted toluene diamines, methylenebis(phenyl amines), alkyl-substituted methylenebis(phenyl amines), 1,5-naphthalene diamine, and phenylene diamines.

* * * * *